United States Patent [19]

Stutzman et al.

[11] 4,235,835

[45] Nov. 25, 1980

[54] THERMOSETTING COMPOSITIONS FOR INJECTION MOLDING

[75] Inventors: Gary L. Stutzman, Flemington; Carlo F. Martino, Somerville, both of N.J.

[73] Assignee: Union Carbide Corporation, New York, N.Y.

[21] Appl. No.: 98,533

[22] Filed: Nov. 29, 1979

Related U.S. Application Data

[63] Continuation of Ser. No. 740,412, Nov. 10, 1976, abandoned.

[51] Int. Cl.³ .................................................. C08K 9/06
[52] U.S. Cl. ................................ 264/328.2; 260/42.15
[58] Field of Search ................. 264/328; 260/42.14, 260/42.15, 42.16, 42.29

[56] References Cited

U.S. PATENT DOCUMENTS

| 3,425,980 | 2/1969 | Baum | 260/42.14 |
| 3,812,228 | 5/1974 | Skoroszewski | 264/328 |
| 3,922,442 | 11/1975 | North | 260/42.15 |
| 3,923,731 | 12/1975 | MacKenzie | 260/42.29 |
| 3,957,719 | 5/1976 | MacKenzie | 260/42.29 |
| 3,959,433 | 5/1976 | Sauers | 260/33.4 P |
| 3,979,180 | 9/1976 | Lorand | 260/42.29 |

FOREIGN PATENT DOCUMENTS 47-78733 8/1972 Japan .

*Primary Examiner*—Paul R. Michl
*Attorney, Agent, or Firm*—Warrick E. Lee, Jr.

[57] ABSTRACT

Vulcanizable ethylene-vinyl acetate compositions, a process for preparing thermoset products by injection molding and crosslinking said compositions, and the articles of manufacture produced therefrom.

12 Claims, No Drawings

THERMOSETTING COMPOSITIONS FOR INJECTION MOLDING

This is a continuation of copending U.S. application Ser. No. 740,412 filed Nov. 10, 1976, now abandoned.

BACKGROUND OF THE INVENTION

This invention relates to vulcanizable ethylene-vinyl acetate compositions suitable for injecting molding, a process for preparing crosslinked thermoset injection molded articles which employs said compositions, and to crosslinked thermoset articles of manufacture prepared therefrom.

The successful manufacture of thermoset injection molded articles requires the use of vulcanizable (crosslinkable) compositions that will not only satisfy the performance requirements of the final article product, but which will also meet the stringent requirements of thermoset injection molding. For instance, thermoset injection molding imposes specific processing conditions on the vulcanizable composition such as stability in the machine barrel for long periods of time (i.e., the avoidance of premature crosslinking), rapid cure times in the heated mold, sufficient flow to fill complex parts, low shrinkage to avoid deformation when thick and thin sections are present and, very importantly, the thermoset molded product must have a sufficient tensile strength at the mold temperature to survive the demolding operation without tearing or distorting. For these reasons, formulations employed in the extrusion coating of a wire or cable and formulations for thermoset injection molding may be widely different and are usually not interchangeable for the two processes.

Heretofore, the thermoset injection molded articles have been made for the most part from elastomeric materials such as ethylene-propylene diene monomers. However, such thermoset EPDM rubbers generally require long cure cycle times at high temperatures and normally require a surface treatment in order to be painted.

It has now been discovered that thermoset injection molded articles can be prepared from the vulcanizable (crosslinkable) ethylene-vinyl acetate compositions of this invention which compositions not only require relatively low temperature short cure cycle times but in addition have good molding latitudes, i.e. are stable in the machine barrel for long periods of time, and also result in thermoset products that have good low temperature impact resistance, a good secant modulus range, good paint adhesion, low shrinkage, high temperature stability and a tensile strength at the mold temperature of at least about 250 pounds per square inch allowing for an easy removal of the thermoset injection molded article from the hot mold during the demolding operation without tearing or distorting said article.

Thus, it is an object of this invention to provide a vulcanizable ethylene-vinyl acetate composition which is particularly useful in the manufacture of thermoset injection molded articles. Another object of this invention is to provide a process for preparing thermoset injection molded articles which comprises employing as the vulcanizable composition, the above mentioned novel composition of this invention. A further object of this invention is to provide an article of manufacture comprising the crosslinked thermoset product obtained upon injection molding and crosslinking said vulcanizable ethylene-vinyl acetate composition of this invention. Other objects and advantages of this invention will become readily apparent from the following description and appended claims.

More specifically, one aspect of the instant invention may be described as a vulcanizable composition suitable for thermoset injection molding consisting essentially of about 35 to about 75 parts by weight of (A) an ethylene-vinyl acetate copolymer containing about 7 to about 55 weight percent of vinyl acetate based on the total weight of said copolymer; about 65 to 25 parts by weight of (B) a clay filler selected from the class consisting of an organosilane treated clay and an organopolyester treated clay; the sum of (A)+(B) being about 100 parts by weight in the composition; about 1 to about 5 parts by weight based on the sum of (A)+(B) of (C) an organic peroxide crosslinking agent having a half-life at its stock temperature of greater than one hour; and 0 to about 5 parts by weight based on the sum of (A)+(B) of (D) an organic crosslinking booster; wherein said components (A), (B), (C) and (D) are such that a crosslinked product obtained upon crosslinking an admixture containing only said components (A), (B), (C) and (D) in the same proportions as (A), (B), (C) and (D) are present in said vulcanizable composition, has a hot tensile strength of at least 250 pounds per square inch when measured according to ASTM D412-64T at the same temperature employed to crosslink said admixture.

DESCRIPTION OF THE PREFERRED EMBODIMENTS

The ethylene-vinyl acetate copolymers, and/or methods for their preparation, which can be employed in the vulcanizable compositions of this invention are well known in the art. Said ethylene-vinyl acetate copolymers can contain from about 7 to about 55, preferably about 10 to about 35, weight percent of vinyl acetate based on the total weight of the copolymer. Moreover, said ethylene-vinyl acetate copolymers may possess any melt index so long as it does not adversely affect the hot tensile strength limitation defined herein above. For instance, crosslinked compositions having a hot tensile strength of at least 250 pounds per square inch when measured according to ASTM D412-64T at the temperature at which they were crosslinked have been obtained with ethylene-vinyl acetate copolymers having melt indexes ranging from about 0.4 to about 375. The most preferred copolymer employed in this invention is an ethylene-vinyl acetate copolymer containing about 28 weight percent vinyl acetate. Of course, it is understood that if desired mixtures of different ethylene-vinyl acetate copolymers, i.e. having different vinyl acetate contents and/or different melt index values can be employed in the vulcanizable compositions of this invention.

The term "clay" as used in this invention represents an inert, water-insoluble, naturally occurring sediment or sedimentary rock composed of one or more minerals and accessory compounds. Usually the clay is rich in hydrated silicates of aluminum, iron, or magnesium or hydrated alumina or iron oxide. These silicates and related minerals exist predominantly in particles of colloidal or near colloidal size and they commonly develop plasticity when sufficiently pulverized and wetted. Examples of such clays include, but are not restricted to, glacial clays, kaolins, ball clays, fire clays, loess, adobe slip clay, bentonite, fullers earth, bleaching clays, and high alumina clays such as nodular clays, bosley flint, bosley and diaspore clays, and bauxite clays. The clays can be crystalline as are those of the kaolin group, for example, kaolmite, dickite and anauxite; of the montmorillonite group, for example, bentonite clays such as beidellite, nontromite, hectonite, saponite and sauconite; of the illite group; and of the attapulgite group; or noncrystalline or amorphous for example, allophane and evansite. Of course, it is understood that such clays can be calcined to remove the water of hydration if desired. The particle size of the clay used is not critical although clays having particle sizes ranging from 0.1 to 100μ and particularly 0.1 to 10μ are preferred.

It is critical that the clay filler be treated (i.e. substantially coated) with an organosilane or organopolyester compound. Vulcanizable compositions containing corresponding untreated clay fillers have not been found to provide a crosslinked thermoset product having a hot tensile strength of at least 250 pounds per square inch as defined herein.

The organosilane compounds of the organosilane treated clay fillers employable in this invention may be any conventional organofunctional silane containing hydrolyzable groups such as those of the formula

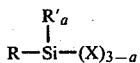

wherein R represents an unsaturated organic radical or a functionally substituted organic radical, R′ represents a monovalent hydrocarbon radical, e.g. phenyl and lower alkyl, preferably methyl, a has a value of 0 or 1, preferably 0, and X represents a hydrolyzable group. Illustrative of the more preferred unsaturated organic radicals are olefinic radicals, e.g. vinyl, allyl, gamma-methacryloxypropyl, and the like. Illustrative of the more preferred functionally substituted organic radicals are amino substituted radicals, such as aminoalkyl radicals, e.g. beta-aminoethyl, gamma-aminopropyl, N-beta (aminoethyl)-gamma-aminopropyl, and the like; epoxy substituted radicals such as beta-(3,4-epoxycyclohexyl)-ethyl, gamma-glycidoxypropyl, and the like and mercapto substituted radicals, e.g. mercaptoalkyl radicals such as beta-mercaptoethyl, gamma-mercapto-propyl and the like. Illustrative of the hydrolyzable groups represented by X are halide atoms, preferably chlorine; alkoxy radicals such as methoxy, ethoxy, 2-methoxyethoxy, and the like; and acyloxy radicals such as acetoxy, and the like. Among the more preferred silane coupling agents that may be mentioned are vinyltrichlorosilane, vinyltriethoxysilane, vinyltrimethoxysilane, vinyltris(2-methoxyethoxy) silane, gamma-methacryloxypropyltrimethoxysilane, beta-(3,4-epoxycyclohexyl)-ethyltrimethoxysilane, gamma-glycidoxypropyltrimethoxysilane, vinyltriacetoxysilane, beta-mercaptoethyltriethoxysilane gamma-mercaptopropyltrimethoxysilane, beta-aminoethyltriethoxysilane, gamma-aminopropyltriethoxysilane, N-beta-(aminoethyl) gamma-aminopropyltrimethoxysilane, and the like. The most preferred organosilanes are the vinyltrialkoxy silanes, especially vinyltris(2-methoxyethoxy) silane.

The organopolyester compounds of the organopolyester treated clay fillers employable in this invention may be any conventional organopolyester. Such conventional polyesters are the reaction products of polyfunctional organic carboxylic acids and/or their anhydrides with polyhydric alcohols. Typical polyfunctional organic carboxylic acids are dicarboxylic aliphatic acids such as succinic, adipic, sebacic, azelaic, glutaric, pimelic, suberic, and the like, and aromatic dicarboxylic acids such as phthalic acid, terephthalic acid, isophthalic acid, and the like. Alternatively the anhydrides of such acids can be employed in producing the polyester. Typical polyhydric alcohols ("polyols") are alkylene glycols such as glycerol, 1,2, 6-hexanetriol, ethylene glycol, trimethylol propane, trimethyolethane, pentaerythritol, propylene glycol, 1,3-butylene glycol, 1,4-butylene glycol, diethylene glycol, dipropylene glycol and the like.

The preferred organopolyesters are the unsaturated polyesters such as the condensation products of an unsaturated dibasic acid, a saturated dibasic acid, and a glycol. The unsaturated intermediates are commonly maleic anhydride, fumaric acid, and the like; the saturated acids are commonly phthalic anhydride, isophthalic acid, adipic acid, and the like; while the glycols are commonly propylene glycol, ethylene glycol, diethylene glycol, dipropylene glycol and the like. Of course, it is understood that such commerical organopolyesters may contain if desired a crosslinking monomer such as styrene, vinyl toluene, methyl methacrylate, α-methyl styrene, diallyl phthalate, and the like; as well as inhibitors to retard crosslinking until the polyester is to be used such as hydroquinone, quinone, t-butyl catechol, and the like. The preferred commercial organopolyesters of the organopolyester treated clay fillers employed in this invention are Paraplex P43 (Rhom & Haas Co.) and Selection 5003L (Pittsburgh Plate Glass Co.) both which are believed to be polyester condensation products of phthalic anhydride, maleic anhydride and 1,2-propane-diol (propylene glycol) dispersed in a styrene monomer.

The particular treatment and manufacture of the organosilane treated clay fillers and organopolyester treated clay fillers employable in this invention is not critical and is well known in the art as seen e.g. by U.S. Pat. Nos. 3,080,256; 3,290,165; 3,390,120; 3,425,980; 3,567,698; and the like. Indeed any such treated clay filler may be employed in this invention so long as it does not adversely affect the hot tensile strength limitation of the present invention as defined herein above. Illustrative examples of such commercial treated clay fillers are Icecap KE and Icecap OE (Burgess Pigment Co.) both of which are vinyltris (2-methoxyethoxy) silane treated calcined clays (aluminum-silicate) and Kaogan 7 (Georgia Kaolin Co.) an unsaturated organopolyester treated kaolinite (aluminum-silicate) where it is believed that the organopolyester is the polyester condensation product of maleic anhydride, phthalic anhydride and 1,2-propandeiol dispersed in styrene. The preferred treated clay fillers employable in this invention are organosilane treated clay fillers. Thus, any organosilane treated clay or organopolyester treated clay or mixtures thereof if desired can be employed in this invention so long as the desired crosslinked product has a hot melt index of at least 250 pounds per square inch as defined herein.

The organic peroxide crosslinking agents employed in this invention include any peroxide crosslinking agent which has a half-life at the stock temperature of the vulcanizable composition employed of at least one hour. Of course, it is understood that the term "stock temperature" as employed herein is that minimum temperature necessary to melt the vulcanizable composition employed, i.e. cause it to flow, so that it may be injected into the heated mold used in the injection molding process. Thus, the vulcanizable compositions of this invention are stable for at least one hour against precrosslinking at their stock temperature. Illustrative examples of such crosslinking agents are 1, 1-bis(t-butylperoxy)-3,3,5-trimethyl cyclohexane, t-butylperoxy isopropyl carbonate, t-butyl peroxy benzoate, dicumyl peroxide, $\alpha,\alpha'$-bis (t-butylperoxy)diisopropyl benzene, 2,5-dimethyl-2, 5-di(t-butylpenoxy) hexane, 2,5-dimethyl-2,5-di(t-butylperoxy) hexyne-3, di-t-butyl peroxide, and the like. Illustrative examples of peroxide crosslinking agents which were found not to satisfy the above defined stock temperature limitation are 2,4-dichlorobenzoyl peroxide and benzoyl peroxide. The most preferred crosslinking agents employed herein is 1, 1-bis(t-butylperoxy)-3,3,5-trimethyl cyclohexane since this specific crosslinker has been found to provide the fastest cure cycle (i.e. less than about three minutes) at the lowest mold (cure) temperature (i.e. about 149° C.) at which a crosslinked product of an admixture containing only above defined components (A), (B), (D) and said specific crosslinker, in the same proportions as (A), (B), (D) and said specific crosslinker are present in the vulcanizable composition having a hot tensile strength of at least 250 pounds per square inch when measured according to ASTM D412-64T at said mold temperature can be obtained. Of course, mixtures of two or more different organic peroxides can be employed if desired.

The organic crosslinking booster compounds and/or methods for their preparation which may if desired be employed in this invention are well known in the art. Such booster compounds, are in general not an essential ingredient of the instant invention in terms of providing for a crosslinked admixture having a hot tensile strength of at least 250 pounds per square inch when measured according to ASTM D412-64T at the mold temperature employed to crosslink the admixture as defined above, but may, if desired by employed to increase the efficiency of the organic perioxide crosslinking agent by helping to provide a faster more complete cure with less by-products. Moreover, while such is not generally necessary to satisfy the minimum hot tensile strength value of the thermoset crosslinked products of this invention, in certain instances the use of a booster may be employed when it is desired to achieve thermoset crosslinked products having an even higher hot tensile strength. Illustrative examples of such organic crosslinking booster compounds include various methacrylate monomers such as trimethylolpropane trimethacrylate, 1,3-butylene glycol dimethylacrylate, ethylene glycol dimethacrylate, tertaethylene glycol dimethacrylate and the like as well as other polyfunctional monomers, such as triallyl cyanurate, and the like. The preferred organic crosslinking booster is trimethylolpropane trimethacrylate. Of course, mixtures two or more different organic crosslinking boosters can be employed, if desired.

As pointed out above, the amount ratio of (A) ethylene-vinyl acetate to (B) silane and/or polyester treated clay filler in the vulcanizable compositions of this invention can range from about 35 to about 75, preferably about 40 to about 65, parts by weight of (A) to about 65 to about 25, preferably about 60 to about 35 parts by weight of (B), the sum amount of ethylene-vinyl acetate plus silane and/or polyester treated clay filler, ((A)+(B)) in said compositions being 100 parts by weight, while the amount of organic peroxide crosslinker (C) present in said compositions can range from about 1 to about 5 parts by weight or higher if desired per 100 parts by weight of the sum of (A)+(B) as defined above, and the amount of organic crosslinking booster compound (D) present in said compositions can range from 0 to about 5 parts by weight or higher if desired per 100 parts by weight of the sum of (A)+(B) as defined above. The most preferred vulcanizable compositions of this invention contain about 60 parts by weight of ethylene-vinyl acetate, about 40 parts by weight of a silane or polyester treated clay filler, about 1.5 parts by weight of an organic peroxide crosslinker, and which are either free from the presence of an organic crosslinking booster or contain about 2.5 parts by weight of an organic crosslinking booster, said components having been defined more fully above.

Of course, it is to be understood that while the presence of additional additives is not required in the compositions of this invention, if desired, said compositions may contain conventional additives in the conventional used quantities commonly employed in vulcanizable compositions suitable for thermoset injection molding. Examples of such additives include, e.g. age resistors, processing aids, stabilizers, antioxidants, crosslinking retarders, pigments, lubricants, ultraviolet stabilizers, antiblock agents and the like. The total amount of such additives when used normally amounting to no more than about 3 percent by weight based on the total weight of the vulcanizable composition.

The vulcanizable compositions of this invention can be prepared in any conventional manner. For instance the components may be merely added in any desired order and milled until they are thoroughly and intimately mixed. Of course when the organic peroxide is present the milling should not be carried out at a temperature which will cause premature crosslinking.

The vulcanizable compositions of this invention are indeed unique. They have a stability at their stock temperature of at least about one hour. Moreover they have been found to provide thermoset crosslinked products having a hot tensile strength of at least 250 pounds, and more preferably at least 400 pounds, per square inch when measured according to ASTM D412-64T at the temperature employed to crosslink the composition. They have been found to be particularly suitable for preparing injection molded products. For instance said hot tensile strength limitation offers an easy screening method for determining which vulcanizable compositions will correspondingly provide for crosslinked thermoset injection molded products having a hot tensile strength of at least 250 pounds per square inch when measured according to ASTM D412-64T at the mold temperature employed in forming said thermoset products. In general the crosslinked thermoset injection molded products of this invention will normally have a higher hot tensile strength value as defined herein than that of the corresponding compression molded crosslinked admixture derived from the same vulcanizable composition. The minimum hot tensile strength value of at least 250 pounds per square inch is considered herein to be that minimum value required to provide for a crosslinked thermoset injection molded product that can be easily removed from the mold without tearing or distorting said molded product. In addition, said vulcanizable compositions have been found to require short cure cycle times, e.g. less than five minutes, to result in thermoset injection molded products. The vulcanizable compositions of this invention also have good flowability and good molding latitudes as discussed above. Of course, it is to be understood that not every possible combination of components may result in a crosslinked product having the same degree of beneficial properties. However, the determination of the more desirable vulcanizable compositions of this invention is well within the knowledge of one skilled in the art and can readily be determined by routine experimentation as taught herein.

The general procedure and equipment employed in injection molding and crosslinking the vulcanizable compositions of this invention can correspond in general to any of the conventional procedures and equipment heretofore employed in injection molding and crosslinking other thermoset vulcanizable compositions, such as EPDM compositions, phenolic resin compositions, and the like. In addition, due to the unique stability against premature crosslinking possessed by the vulcanizable compositions of this invention, said compositions can, if desired, be also used in recently developed warm runner injection molding equipment such as that shown, e.g. in U.S. Pat. Nos. 3,591,897 and 3,959,433. Such warm runner injection molding equipment contains a runner that carries the vulcanizable composition to the hot mold cavity, said runner being insulated from the hot mold and maintained at a temperature below that of the hot mold and insufficient to cause crosslinking of the vulcanizable composition during that period of time that said vulcanizable composition is in the runner during a normal molding operation. In older more conventional systems the runner is not insulated from the hot mold cavity but maintained at the same temperature of the hot mold thus causing crosslinking of the vulcanizable composition in the runner. In contrast in the warm runner molding operation the vulcanizable composition stays softened and flowable in the runner of the injection molding apparatus, but does not cure in the runner under normal operations. Rather it is injected into the hot mold cavity by the next charge of vulcanizable composition. Accordingly, the amount of crosslinked thermoset scrap generated by the warm runner molding system is far less than that generated by the older conventional system since the vulcanizable composition in the warm runner is not lost (i.e. crosslinked).

In general the injection molded method of preparing the crosslinked thermoset articles of manufacture of this invention involves heating the vulcanizable composition of this invention in an injection barrel to a stock temperature of about 100° C. to about 120° C. preferably about 105° C., to melt (i.e. soften it to a state of flow) the vulcanizable composition. The flowable softened vulcanizable composition is then forced (injected) into the preheated mold of the injection molding apparatus by a ram or screw means, said mold having been preheated to a temperature sufficient to crosslink the vulcanizable composition within about five minutes, more preferably in about three minutes, and said composition maintained therein until crosslinked. The desired thermoset crosslinked molded product may then be demolded in any conventional manner such as e.g. by being mechanically punched out, air-ejected or more simply, merely pulled out by hand. The preheated mold temperature will of course depend upon the particular vulcanizable composition employed and in general may range from about 138° C., more preferably from about 149° C. up to about 204° C. or higher if desired. When warm runner injection molding equipment is employed it is preferred to maintain the temperature of the runner at approximately the stock temperature of the vulcanizable composition, e.g. about 100° C. to about 120° C., preferably about 105° C.

Thus, another aspect of this invention relates to a process for preparing a crosslinked thermoset injection molded product having a hot tensile strength of at least 250 pounds per square inch when measured according to ASTM D412-64T at the mold temperature employed in said process, which process comprises injecting a vulcanizable ethylene-vinyl acetate composition of this invention into a preheated mold, said mold having been preheated to a temperature sufficient to crosslink said vulcanizable composition within five minutes, crosslinking said composition in said mold, and recovering the thermoset injected molded product by removing it from said mold. The vulcanizable compositions and process conditions as well as their preferred embodiments have already been given above. The term "crosslinked" as used herein means that the product is permanently and irreversably fused into the shape or form which was taken during the molding steps. This is in contrast to a thermoplastic article which can be reformed by simply heating the article to a temperature above the crystalline melting point or glass-transition temperature of the resin.

Accordingly, yet another aspect of this invention may be described as an article of manufacture comprising a crosslinked thermoset product obtained upon injection molding and crosslinking a vulcanizable composition of this invention, said crosslinked product having a hot tensile strength of at least 250 pounds per square inch, more preferably at least about 400 pounds per square inch, when measured at the mold temperature according to ASTM D412-64T employed to effect said crosslinking.

The general procedures for preparing said articles of manufacture of this invention are the same as disclosed herein above. Of course, it is understood that said articles of manufacture can take any shape or form desired such being merely dependent upon the type of mold used and product desired.

The crosslinked thermoset product articles of manufacture of this invention are indeed unique in that they have good low temperature impact resistance, a good secant modulus range, good paint adhesion, low shrinkage, good tensile strength and elongation properties, high temperature stability, good flex life, good chemical and stress crack resistance, and the like. Moreover, due to their excellent hot tensile strength crosslinked thermoset products of this invention have been found to be generally easily removable from the hot mold without tearing or distorting the product.

The crosslinked thermoset articles of manufacture of this invention have a wide range of utility and may be used in the same manner as any number of flexible structural and cosmetic applications heretofore mainly restricted to the use of conventional elastomer (e.g. EPDM) type injection molded articles. For instance, they have many uses in the automotive and applicance industries as well as in the areas of sporting goods and recreation. For example, they can be employed as automotive sight shields, gaskets, rub stripes, flex fenders, engine shrouds, bumper guards, moldings, wheel coverings, hoses, swim fins, scuba equipment, handle bar covers, as well as for any other number of uses that require structural integrity of the article at temperatures above its normal melting point.

The following examples are illustrative of the present invention and are not to be regarded as limitative. It is to be understood that all parts, percentages and proportions referred to herein and in the appended claims are by weight unless otherwise indicated. Moreover in the following examples the hot tensile strength values at the various cure temperatures employed in crosslinking the vulcanizable compositions were all measured according to ASTM D-412-64T published in the 1975 Book of the American Society for Testing and Materials.

EXAMPLES 1 to 4

Four vulcanizable ethylene-vinyl acetate compositions were prepared having the following formulations:

TABLE I

| Components | (Parts by Weight) | | | |
|---|---|---|---|---|
| | Example 1 | Example 2 | Example 3 | Example 4 |
| *EVA | 60 | 60 | 60 | 60 |
| **Filler | 40 | 40 | 40 | 40 |
| +Organic Peroxide | 1.5 | 1.5 | 1.5 | 1.5 |
| ++Crosslinking Booster | — | 1.0 | 2.0 | 5.0 |

*Ethylene (72%)/Vinyl Acetate (28%) Copolymer, Melt Index 20
**Vinyltris(2-methoxyethoxy)silane treated calcined clay (Icecap KE; Burgess Pigment Co.)
+1,1-bis(t-butylperoxy)-3,3,5-trimethylcyclohexane (Lupersol 231; Penwalt Corp.)
++Trimethylol propane trimethacrylate (Chemlink 30; Ware Chem. Corp.)

Each composition was formed and compression molded in the same manner at about 260° F. into a square plaque (about 0.125 inches thick). Each plaque was then cured (crosslinked) in the same manner in the mold by raising the temperature to about 280°–300° F. and maintaining the plaque at said temperature under pressure (about 3000 psi ram force) for about 15 minutes.

Various physical tests were then conducted on the crosslinked molded plaques made from each composition and the results of said tests are given in TABLE II below.

TABLE II

| Physical Properties | Example 1 | Example 2 | Example 3 | Example 4 |
|---|---|---|---|---|
| *SMOE (psi) | 8100 | 8730 | 9350 | 11000 |
| Tensile Strength at R.T. (psi) | 2240 | 2360 | 2710 | 2690 |
| Hot Tensile Strength at 300° F. (psi) | 371 | 394 | 457 | 409 |
| Elongation at R.T. (%) | 293 | 277 | 240 | 170 |
| Elongation at 300° F. (%) | 203 | 183 | 127 | 83 |

*Secant Modulus of Elasticity

The above data demonstrates the high hot tensile strength of the crosslinked products obtained from the vulcanizable compositions of this invention and the effect obtained in varying the amount of crosslinking booster.

EXAMPLES 5 TO 19

A series of vulcanizable ethylene-vinyl acetate compositions were prepared wherein the weight percent of vinyl acetate in the ethylene-vinyl acetate copolymer employed was varied as was the melt index of said copolymers. The basic formulation of each composition was as follows.

| FORMULATION | |
|---|---|
| Component | Parts by Weight |
| *EVA | 60 |
| **Filler | 40 |
| +Organic Peroxide | 1.5 |
| ++Crosslinking Booster | 2.5 |

*Ethylene-vinyl acetate copolymer (varied as shown in TABLE III below)
**Icecap KE (Same as defined in TABLE I)
+Lupersol 231 (Same as defined in TABLE I)
++Chemlink 30 (Same as defined in TABLE I)

Each composition was formed and compression molded in the same manner at about 105° C. into a square plaque (about 0.125 inches thick). Each plaque was then cured (crosslinked) in the same manner in the mold by raising the temperature to about 300° F. and maintaining the plaque at said temperature under pressure (about 3000 psi ram force) for about 15 minutes).

Various physical property tests were then conducted on the crosslinked molded plaques made from each composition and the results of said tests are given in TABLE III below.

TABLE III

| | EVA Copolymer | | Tensile Strength at R.T. | Elongation at R.T. | Hot Tensile Strength at 300° F. | Elongation at 300° F. | SMOE |
|---|---|---|---|---|---|---|---|
| Example | % VA | Melt Index | (psi) | (%) | (psi) | (%) | (psi) |
| 5 | 3.5–5 | 1.0 | 2400 | 120 | 142 | 107 | 49,700 |
| 6 | 9–11.5 | 3.0 | 2620 | 170 | 366 | 103 | 24,700 |
| 7 | 18 | 2.5 | 2830 | 247 | 476 | 110 | 18,700 |
| 8 | 27–29 | 0.4 | 2450 | 173 | 260 | 60 | — |
| 9 | 28 | 1.2 | 2350 | 183 | 308 | 73 | — |
| 10 | 32–34 | 1.2 | 2020 | 303 | 427 | 120 | — |
| 11 | 27–29 | 5.0 | 2440 | 230 | 525 | 110 | — |
| 12 | 32–34 | 5.0 | 2220 | 253 | 517 | 120 | — |
| 13 | 24–26 | 12.0 | 2390 | 213 | 236 | 87 | — |
| 14 | 27–29 | 12.0 | 2750 | 193 | 565 | 100 | — |
| 15 | 27–29 | 50.0 | 2160 | 283 | 491 | 137 | — |
| 16 | 27–29 | 165.0 | 1840 | 257 | 402 | 140 | — |
| 17 | 27–20 | 375.0 | 1430 | 247 | 264 | 137 | — |
| 18 | 45 | 0.7 | 2310 | 223 | 406 | 80 | — |
| 19 | 55 | 6.0 | 1660 | 350 | 284 | 83 | — |

The above data demonstrates the high hot tensile strength of the crosslinked products obtained from the vulcanizable compositions of this invention and the effect obtained in varying the amount of vinyl acetate in the copolymer and the melt index of the copolymer. The low test results at 300° F. for Example 13 are believed to be due to an error in testing.

EXAMPLES 20 TO 24

Five vulcanizable ethylene-vinyl acetate compositions were prepared having the following formulations.

TABLE IV

| | (Parts by Weight) | | | | |
|---|---|---|---|---|---|
| Components | Example 20 | Example 21 | Example 22 | Example 23 | Example 24 |
| *EVA | 60 | 60 | 60 | 60 | 60 |
| **Filler A | 40 | 40 | — | — | — |
| ***Filler B | — | — | 40 | — | — |
| ****Filler C | — | — | — | 40 | 40 |
| +Organic Peroxide | 1.0 | 1.0 | 1.0 | 1.0 | 1.0 |
| ++Cross-linking Booster | — | 2.5 | 2.5 | — | 2.5 |

*Ethylene (72%)/Vinyl Acetate (28%) Copolymer Melt Index 20
**An untreated alkaline talc filler (magnesium silicate) (Mistron Vapor; Cyprus Mines, United Sierra Div.)
***An untreated calcined clay (Icecap K; Burgess Pigment Co.) which is the same as Icecap KE, but without being organosilane treated.
****Vinyltris(2-methoxyethoxy)silane treated calcined clay (Icecap OE; Burgess Pigment Co.) which is the same as Icecap KE, except for being smaller in particle size.
+Lupersol 231 (Same as defined in TABLE I) ++Chemlink 30 (Same as defined in TABLE I)

Each composition was formed and compression molded in the same manner at about 210° F. in a square plaque. Each plaque was then cured (crosslinked) in the same manner in the mold by raising the temperature to about 300° F. and maintaining the plaque at said temperature under pressure (about 3000 psi ram force) for about fifteen minutes.

TABLE V

| Physical Properties | Example 20 | Example 21 | Example 22 | Example 23 | Example 24 |
|---|---|---|---|---|---|
| SMOE(psi) | 13,200 | 15,800 | — | 7,970 | 9,750 |
| Tensile Strength at R.T. (psi) | 1,190 | 1,260 | — | 260 | 361 |
| Elongation at R.T. (%) | 217 | 230 | — | 293 | 190 |
| Hot Tensile at 300° F. (psi) | Failed in Conditioning | 18 | Failed in Conditioning | 260 | 361 |
| Elongation at 300° F. (%) | Failed in Conditioning | 140 | — | 320 | 113 |

TABLE V-continued

| Physical Properties | Example 20 | Example 21 | Example 22 | Example 23 | Example 24 |
|---|---|---|---|---|---|
| ing | | | | | |

The vulcanizable composition of Examples 20 and 22 failed to crosslink at 300° F. and melted into a flowable state. Attempts to crosslink the composition of Example 22 at temperatures up to 360° F. also failed.

The above data demonstrates that vulcanizable compositions (Examples 20-22) outside the scope of this invention having untreated clay fillers failed to provide thermoset crosslinked products having high hot tensile strengths as provided for by the vulcanizable compositions of this invention (Examples 23 and 24).

EXAMPLES 25 TO 27

Three vulcanizable compositions were prepared wherein the organic peroxide crosslinker was varied. The basic formulation of each composition was as follows.

FORMULATION

| Component | Parts by Weight |
|---|---|
| *EVA | 60 |
| **Filler | 40 |
| +Organic Peroxide | Varied |
| Crosslinking Booster | 2.5 |

*Ethylene (72%)/Vinyl Acetate (28%) Copolymer, Melt Index 20
**Icecap KE (Same as defined in TABLE I)
+Varied as shown in TABLE VI below.
++Chemlink 30 (same as defined in TABLE I)

The organic peroxide employed in each composition was used in different amounts to achieve a concentration of 0.005 moles of peroxide per 100 parts of resin (i.e. EVA copolymer and filler), so that the same molar concentration of peroxide crosslinker was employed for each composition.

Each composition was formed and compression molded in the same manner into a square plaque. Each plaque was then cured (crosslinked) in the mold by raising the temperature to that temperature where the half-life of the particular organic peroxide employed in benzene is about one and one-half minutes and maintaining the plaque at said temperature for about 15 minutes. The particular curing temperature employed for each composition is given in TABLE VI below, as are various physical properties obtained for each crosslinked molded plaque made from each composition.

TABLE VI

| Example No. | Organic Peroxide | Parts by Weight of Peroxide | Cure Temp. | Tensile Strength at R.T. (psi) | Elongation at R.T. (%) | Hot Tensile Strength at Cure Temp. (psi) | Elongation at Cure Temp. (%) |
|---|---|---|---|---|---|---|---|
| 25 | *Dicup | 1.35 | 174° C. | 2420 | 227 | 494 | 93 |
| 26 | **Vulcup | 1.69 | 178° C. | 2790 | 177 | 614 | 70 |
| 27 | ***Lupersol 130 | 1.43 | 190° C. | 2530 | 220 | 438 | 60 |

*Di-α-cumyl peroixde
**α,α'-bis(t-butylperoxy)diisopropyl benzene
***2,5-dimethyl-2',5'-di(t-butylperoxy)hexyne-3

The above data demonstrates that thermoset crosslinked products having high tensile strengths are also obtained when other organic peroxides are used.

EXAMPLES 28 TO 33

A series of vulcanizable ethylene-vinyl acetate compositions were prepared using different silane treated clay fillers in different amounts. The formulations of said compositions are given in TABLE VII below.

TABLE VII

| Components | (Parts by Weight) | | | | | |
|---|---|---|---|---|---|---|
| | Example 28 | Example 29 | Example 30 | Example 31 | Example 32 | Example 33 |
| *EVA | 90 | 75 | 60 | 90 | 75 | 60 |
| **Filler A | 10 | 25 | 40 | — | — | — |
| ***Filler B | — | — | — | 10 | 25 | 40 |
| +Organic Peroxide | 2.5 | 2.5 | 2.5 | 2.5 | 2.5 | 2.5 |

*Ethylene (72%)/Vinyl Acetate (28%) Copolymer; Melt Index 20
**N-beta(aminoethyl)-gamma-aminopropyl-trimethoxysilane treated hydrated aluminum silicate (Nulok 321; J.M. Huber Co.)
***Icecap KE (same as defined in TABLE I)
+Lupersol 231 (same as defined in TABLE I)

Each composition was formed and compression molded in the same manner at about 105° C. into a square plaque (about 0.125 inches thick). Each plaque was then cured (crosslinked) in the same manner in the mold by raising the temperature to about 300° F. and maintaining the plaque at said temperature under pressure (about 3000 psi ram force) for about 15 minutes.

Various physical property tests were then conducted on the crosslinked molded plaques made from each composition and the results of said tests are given in TABLE VIII below.

TABLE VIII

| +Physical Properties | Example 28 | Example 29 | Example 30 | Example 31 | Example 32 | Example 33 |
|---|---|---|---|---|---|---|
| SMOE(psi) | 3530 | 4600 | 7220 | 3620 | 5500 | 8250 |
| Tensile Strength at R.T. (psi) | 1740 | 1920 | 1840 | 1820 | 1730 | 2400 |
| Elongation at R.T. (%) | 477 | 477 | 363 | 443 | 353 | 220 |
| Hot Tensile Strength at 300° F. (psi) | 147 | 209 | 281 | 147 | 180 | 390 |
| Elongation at 300° F. (%) | 160 | 140 | 100 | 123 | 157 | 113 |

The given values of SMOE all represent an average value of five runs for each Example. The given Tensile Strength and Elongation values both at R.T. (room temperature) and at 300° F. all represent an average value of three runs for each Example.

The above data demonstrates the effect in employing different amount ratios of ethylene-vinyl acetate copolymer to treated clay filler in obtaining thermoset crosslinked products.

EXAMPLES 34 TO 37

Four vulcanizable ethylene-vinyl acetate compositions were prepared having the following formulations given in TABLE IX below.

TABLE IX

| Components | (Parts by Weight) | | | |
|---|---|---|---|---|
| | Example 34 | Example 35 | Example 36 | Example 37 |
| *EVA | 60 | 40 | 40 | 40 |
| **Filler A | 40 | 60 | 60 | — |
| ***Filler B | — | — | — | 60 |
| +Organic Peroxide | 1.5 | 1.5 | 1.5 | 1.5 |
| ++Crosslinking Booster | 2.5 | 2.5 | 2.5 | 2.5 |

*Ethylene (60%)/vinyl aceate (40%) copolymer; Melt Index 51.5
**Icecap KE (same as defined in TABLE I)
***An unsaturated polyester treated Kaolinite filler (Kaogan 7; Georgia Kaolin Co.). The polyester is believed to be the condensation product of maleic anhydride, phthalic anhydride and 1,2 propanediol dispersed in styrene.
+Lupersol 231 (same as defined in TABLE I)
++Chemlink 30 (same as defined in TABLE I)

Each composition was formed and compression molded in the same manner at about 105° C. into a square plaque (about 0.125 inches thick). Each plaque was then cured (crosslinked) in the same manner in the mold by raising the temperature to about 300° F. and maintaining the plaque at said temperature under pressure (about 3000 psi ram force) for about 15 minutes.

Various physical property tests were then conducted on the crosslinked molded plaques made from each composition and the results of said tests are given in TABLE X below.

TABLE X

| Physical Properties | Example 34 | Example 35 | Example 36 | Example 37 |
|---|---|---|---|---|
| SMOE (psi) | 1480 | 4960 | — | — |
| Tensile Strength at R.T. (psi) | 1640 | 2360 | 2130 | 1160 |
| Elongation at R.T.(%) | 323 | 140 | 142 | 188 |
| Hot Tensile Strength at 300° F. (psi) | 800+ | 1510+ | 549 | 516 |
| Elongation at 300° F. (%) | 133 | 80 | 38 | 50 |

+These values appear to be high. Example 36 which is a duplicate of Example 35 is believed to give the more correct hot tensile strength value.

The above data demonstrates that high tensile strength thermoset crosslinked products were obtained with both a silane and a polyester treated clay filler.

EXAMPLES 38 TO 41

Four vulcanizable compositions were prepared wherein the organic peroxide crosslinker was varied. The basic formulations of each compositions are given in TABLE XI below.

TABLE XI

| Components | Example 38 | Example 39 | Example 40 | Example 41 |
|---|---|---|---|---|
| *EVA | 60 | 60 | 60 | 60 |
| **Filler | 40 | 40 | 40 | 40 |
| +Organic Peroxide A | 1.0 | 1.0 | — | — |
| ++Organic Peroxide B | — | — | 1.2 | 1.2 |
| +++Crosslinking Booster | — | 2.5 | — | 2.5 |

*Ethylene (72%)/Vinyl Acetate (28%) Copolymer; Melt Index 20
**Icecap KE (Same as defined in TABLE I)
+t-butyl perbenzoate
++t-butyl-isopropylmonoperoxycarbamate (75% in mineral spirits)
+++Chemlink 30 (Same as defined in TABLE I)

The organic peroxide employed in each composition was used in different amounts to achieve a concentration of 0.005 moles of peroxide per 100 parts of resin (i.e. EVA copolymer and filler), so that the same molar concentration of peroxide crosslinker was employed for each composition.

Each composition was formed and compression molded in the same manner into a square plaque. Each plaque was then cured (crosslinked) in the mold by raising the temperature to that temperature where the half-life of the particular organic peroxide employed in benzene is about one-half minute and maintaining the plaque at said temperature for about 15 minutes. The particular curing temperature employed for each composition is given in TABLE XII below, as are the various physical property results obtained for each crosslinked molded plaque made from each composition.

TABLE XII

| Example No. | Cure Temperature | Tensile Strength at R.T. (psi) | Elongation at R.T. (%) | Hot Tensile Strength at Cure Temp. (psi) | Elongation at Cure Temp. (%) |
|---|---|---|---|---|---|
| 38 | 170° C. | 2540 | 253 | 505 | 97 |
| 39 | 170° C. | 2510 | 223 | 551 | 80 |
| 40 | 173° C. | 2370 | 300 | 428 | 113 |
| 41 | 173° C. | 2090 | 267 | 159 | 100 |

The above data demonstrates that various organic peroxides can be used to obtain thermoset crosslinked products having high hot tensile strengths. The organic peroxide of Example 41 is apparently not compatible with the crosslinking booster employed.

EXAMPLES 42 TO 56

A series of crosslinked thermoset injection molded ethylene-vinyl acetate products were prepared by injection molding and crosslinking a vulcanizable ethylene-vinyl acetate composition consisting of the following formulation at various cure temperatures using various cure times.

FORMULATION

| Component | Parts by Weight |
|---|---|
| *EVA | 60 |
| **Filler | 40 |
| +Organic Peroxide | 1.5 |
| ++Crosslinking Booster | 2.5 |

*Ethylene (72%)/vinyl acetate (28%); Melt Index 20
**Icecap KE (same as defined in TABLE I)
+Lupersol 231 (same as defined in TABLE I)
++Chemlink 30 (same as defined in TABLE I)

Each vulcanizable composition was injection molded and cured in the same manner using a Model 175, New Britain thermoset injection molding machine having an ASTM Family Mold consisting of five mold cavities (a) an 8 inch long, 0.125 inch thick tensile bar (dog bone), (b) a 0.250 inch thick flex bar, (c) a 0.5 inch thick Izod impact bar, (d) a 0.125 inch thick, four inch disk, and (e) a 0.125 inch thick, two inch disk.

The conditions used for the injection molding procedure were as follows.

TABLE XIII

| Barrel Temperatures | |
|---|---|
| Zone 1 | 125° F. (indicated) |
| Zone 2 | 150° F. (indicated) |
| Nozzel Temperature | 185°-190° F. (indicated) |
| Stock Temperature | 205° F. (measured) |
| Screw Speed | 52 RPM |
| Screw Travel | 4¾inches |
| Plasticizing Pressure | 25 psig. (390 psi) |
| Injection Pressure | 800 psig. (12,350 psi.) |
| Holding Pressure | 800 psig. (12,350 psi.) |
| Plasticizing Time | 60 seconds |
| Injection Time | 12 seconds |
| Total Cure Cycle Time | Varied (up to 3 minutes) |
| Mold Temperature | Varied (300° F. to 360° F.) |

Various cure temperatures and cure times were employed to determine their influence on the physical properties of the crosslinked products and to determine the shortest cure times required to achieve various optimum properties of the crosslinked products. The various cure temperatures and cure times are given in TABLE XIV below as are various physical properties for the crosslinked thermoset injection molded products obtained.

TABLE XIV

| Example No. | Cure Time (Minutes) | Cure Temp. | Tensile Strength at R.T. (psi) | Elongation at R.T.(%) | Hot Tensile Strength at Cure Temp. (psi) | Elongation at Cure Temp. (%) | Izod Impact at −20° F. |
|---|---|---|---|---|---|---|---|
| 42 | 1 | 300° F. | 2450 | 170 | 517 | 75 | 2.07 |
| 43 | 2 | 300° F. | 2580 | 177 | 514 | 80 | 3.7 |
| 44 | 3 | 300° F. | 2660 | 203 | 474 | 63 | 2.14 |
| 45 | 45(seconds) | 320° F. | 2210 | 125 | 578 | 55 | 2.95 |
| 46 | 1 | 320° F. | 2630 | 177 | 548 | 63 | 5.32 |
| 47 | 2 | 320° F. | 2700 | 147 | 446 | 57 | 6.23 |
| 48 | 3 | 320° F. | 2730 | 167 | 462 | 57 | 6.72 |
| 49 | 1 | 340° F. | 2820 | 160 | 446 | 50 | 3.79 |
| 50 | 2 | 340° F. | 2870 | 160 | 405 | 50 | 4.40 |
| 51 | 3 | 340° F. | 2800 | 147 | 470 | 57 | 2.47 |
| 52 | 35(seconds) | 360° F. | 2740 | 187 | 362 | 35 | 2.09 |
| 53 | 45(seconds) | 360° F. | 2720 | 163 | 318 | 13 | 2.67 |
| 54 | 1 | 360° F. | 2830 | 147 | 368 | 40 | 3.15 |
| 55 | 2 | 360° F. | 2820 | 137 | 333 | 37 | 2.23 |
| 56 | 3 | 360° F. | 2720 | 127 | 329 | 40 | 2.56 |

The thermoset crosslinked product samples of Examples 43,44,47,48 and 51 to 56 all exhibited very good tear strength and were easily removed from the mold without any tearing of the samples. The ejector pins indented the Izod bar of Example 52 and damaged the Izod bar of Example 53. In Examples 52 to 56 the mold cavities of the apparatus were sprayed with Teflon (E. I. DuPont de Nemours and Co.) prior to injection of the vulcanizable composition. The thermoset crosslinked product samples of Examples 42,45,46,49 and 50 all exhibited poor mold release.

The above data demonstrates that the best tensile properties of the 0.125 inch thick tensile bar at the mold temperature result when the samples are cured at about 45 seconds to about one minute at about 300° F. to 320° F. Higher cure temperatures result in poorer tensile strength measured at that cure temperature. The Izod impact values at −20° F. show that thicker samples (0.5 inches thick) need to be cured for approximately three minutes at about 320° F. to reach optimum impact strength.

EXAMPLES 57 TO 62

The vulcanizable compositions of Examples 38, 39 and 41, hereinafter referred to as Resins A, B and C respectively were employed to prepared crosslinked thermoset injection molded products by the same procedure and apparatus as described in and for Examples 42 to 56 above. The cure time and cure temperature employed as well as the physical properties of the crosslinked sample products are given in TABLE XV below.

TABLE XV

| Example No. | Cure Time Minutes | Cure Temp. | Tensile Strength at R.T.(psi) | Elongation at R.T. (%) | Hot Tensile Strength at Cure Temp. (psi) | Elongation at Cure Temp. (%) | Izod Impact at −20° F. |
|---|---|---|---|---|---|---|---|
| 57 | 1 | 338° F. | — | — | — | — | — |
| 58 | 2 | 338° F. | 2460 | 133 | 286 | 43 | 3.21 |
| 59 | 3 | 338° F. | 2750 | 167 | 486 | 60 | 2.03 |
| 60 | 2 | 338° F. | 2850 | 140 | 457 | 33 | 3.22 |
| 61 | 3 | 338° F. | 3120 | 160 | 504 | 40 | 2.41 |
| 62 | 45(seconds) | 338° F. | — | — | — | — | 1.65 |

The thermoset crosslinked product samples of Examples 59 to 61 both exhibited very good tear strength and were easily removed from the mold without tearing. The thermoset product samples of Examples, 57, 58 and 60 exhibited poor mold release due to inadequate curing of the vulcanizable compositions. The thermoset products of Example 62 exhibited good mold release (the mold having been presprayed with Teflon) even though a deliberately insufficient cure time was employed.

The above data demonstrates that the best results were obtained when the vulcanizable compositions were cured for about three minutes at about 338° F.

EXAMPLE 63

The crosslinked thermoset injection molded products (i.e. the 0.125 inch thick, four inch disks) of Examples 42 to 56 and 58 to 61 above were tested for paint adhesion according to the following procedure.

Prior to painting the crosslinked injection molded samples of said Examples 42, 44 to 46, 49 to 51, 55 and 56 and surfaces of said samples were first cleaned with dichloromethane to remove any surface grime deposited during handling. The crosslinked injection molded samples of said Examples 43, 47, 48, 52 to 54 and 58 to 61 were used as is and were tested without cleaning their surfaces.

Each sample was then top coated in the same manner with Durathane 100 (Pittsburgh Plate Glass Co.), and elastomeric automotive paint. After drying for several minutes at room temperature, each coated sample was placed in an oven and the paint cured at 107° C. (250° F.) for 30 minutes. The painted samples were then stored at room temperature for three days and then tested using the automotive "scotch" test. This test involves scoring the sample into ten grids (crosshatch pattern) and placing a strip of Scotch 600 tape over the scored area. The tape is rubbed to give maximum contact between the tape and the sample. The tape is then quickly pulled from the sample and the grids removed with the tape are counted and expressed as percent paint loss.

The painted samples of Examples 42 and 43 exhibited a 10% and 50% paint loss, respectively, while all the other painted samples of the remaining Examples exhibited a zero percent paint loss.

This example demonstrates the excellent paint adhesion of the crosslinked thermoset injection molded products of this invention.

EXAMPLE 64

A vulcanizable ethylene-vinyl acetate composition having the formulation

| Component | Parts by Weight |
|---|---|
| *EVA | 60 |
| **Filler | 40 |
| +Organic Peroxide | 1.5 |
| ++Crosslinking Booster | 2.5 |

*Ethylene (72%)/Vinyl Acetate (28%), Melt Index 20
**Icecap KE (Same as defined in Table I)
+Lupersol 231 (Same as defined in Table I)
++Chemlink 30 (Same as defined in Table I)

was injection molded and crosslinked in a four ashtray cavity warm runner injection molding apparatus. The cure temperature was about 300° F., the cure cycle time about 3 minutes and the temperature of the runner was maintained at about 195° C. to about 205° C. the same as the stock temperature of the plasticized composition in the barrel. The crosslinked thermoset injection molded products produced were easily removed from the ashtray molds without tearing. The operation was run continuously for eight hours without any undesirable crosslinking of the vulcanizable composition in the runner of the apparatus.

EXAMPLE 65

A vulcanizable ethylene-vinyl acetate composition having the formulation

| Component | Parts by Weight |
|---|---|
| *EVA | 60 |
| **Filler | 40 |
| +Organic Peroxide | 1.5 |

*Ethylene (72%)/Vinyl Acetate (28%); Melt Index 20
**Icecap KE (Same as defined in Table I)
+Lupersol 231 (Same as defined in Table I)

was injection molded and crosslinked into thermoset injection molded products using the same procedure and apparatus as described in and for Examples 42 to 56 above. The mold cure temperature employed was about 300° F. while the cure cycle time was about 3 minutes. The crosslinked sample products were all easily removed from the mold without tearing and the physical properties of the products obtained are given in TABLE XVI below.

TABLE XVI

|  | Physical Properties |
|---|---|
| Tensile Strength at R.T. (psi) | 2660 |
| Elongation at R.T. (%) | 147 |
| Hot Tensile Strength at 300° F. (psi) | 320 |
| Elongation at 300° F. (%) | 40 |
| SMOE (psi) | 8950 |

The above data demonstrates that high hot tensile strength for the thermoset crosslinked injection molded product may be obtained in the absence of a crosslinking booster.

Various modifications and variations of this invention will be obvious to a worker skilled in the art and it is to be understood that such modifications and variations are to be included within the purview of this application and the spirit and scope of the appended claims.

What is claimed is:

1. A process for preparing a thermoset injection molded product having a hot tensile strength of at least 250 pounds per square inch when measured according to ASTM D412-64T at the mold temperature employed in said process, which process comprises the steps of:
    injecting a vulcanizable composition into a preheated mold, said mold having been preheated to a temperature sufficient to crosslink said vulcanizable composition within five minutes, said composition consisting essentially of about 35 to about 75 parts by weight of (A) an ethylene-vinyl acetate copolymer containing about 7 to about 55 weight percent of vinyl acetate based on the total weight of said copolymer; about 65 to about 25 parts by weight of (B) a clay filler selected from the class consisting of an organosilane treated clay and an organopolyester treated clay wherein said organopolyester is reaction product of polyfunctional organic carboxylic acid and/or polyfunctional organic carboxylic acid anhydride with polyhydric alcohol; the sum of (A)+(B) being about 100 parts by weight in the composition; about 1 to about 5 parts by weight based on the sum of (A)+(B) of (C) an organic peroxide crosslinking agent having a half-life at its stock temperature of greater than one hour; and 0 to about 5 parts by weight based on the sum of (A)+(B) of (D) of an organic crosslinking booster; wherein said components (A), (B), (C) and (D) are such that a crosslinked product obtained upon crosslinking an admixture containing only said components (A), (B), (C) and (D) in the same proportions as (A), (B), (C) and (D) are present in said vulcanizable composition, has a hot tensile strength of at least 250 pounds per square inch when measured according to ASTM D412-64T at the same temperature employed to crosslink said admixture;
    crosslinking said composition in said mold, and
    recovering the thermoset injected molded product by removing it from said mold.

2. The process of claim 1, wherein the ethylene-vinyl acetate copolymer contains from about 10 to about 35 weight percent of vinyl acetate based on the weight of the copolymer, wherein the clay filler is an organosilane treated clay, and wherein the amount ratio of (A) to (B) ranges from about 40 to about 65 parts by weight of (A) to about 60 to about 35 parts by weight of (B).

3. The process of claim 2, wherein the organic peroxide crosslinking agent is 1,1-bis(t-butylperoxy)-3,3,5-trimethyl cyclohexane.

4. The process of claim 2, wherein the organosilane treated filler is vinyltris (2-methoxyethoxy) silane treated calcined clay.

5. The process of claim 3, wherein the crosslinking booster is trimethylol propane trimethacrylate.

6. The process of claim 2, wherein the ethylene-vinyl acetate copolymer contains about 28 weight percent vinyl acetate and has a melt index of about 20, and wherein the amount of ratio of (A) to (B) is about 60 parts by weight of (A) to about 40 parts by weight of (B).

7. The process of claim 6, wherein the organic peroxide crosslinking agent is present in an amount of about 1.5 parts by weight based on the sum of (A)+(B) and wherein said organic peroxide is 1,1-bis(t-butylperoxy)-3,3,5-trimethyl cyclohexane.

8. The process of claim 7, wherein the organosilane treated filler is vinyltris (2-methoxyethoxy) silane treated calcined clay.

9. The process of claim 8, wherein the organic crosslinking booster is trimethylol propane trimethacrylate.

10. The process of claim 9, wherein the organic crosslinking booster is present in an amount of about 2.5 parts by weight based on the sum of (A)+(B).

11. The process of claim 1, wherein said mold has been preheated to a temperature sufficient to crosslink the composition in about three minutes.

12. The process of claim 1, wherein warm runner injection molding is employed, the runner being maintained at about the same temperature as the stock temperature of the vulcanizable composition.

* * * * *